United States Patent
Yang et al.

(10) Patent No.: US 11,271,783 B2
(45) Date of Patent: Mar. 8, 2022

(54) DECISION FEEDBACK EQUALIZATION EMBEDDED IN A SLICER

(71) Applicant: Taiwan Semiconductor Manufacturing Co., Ltd., Hsin-Chu (TW)

(72) Inventors: Shu-Chun Yang, Xihu Township (TW); Wen-Hung Huang, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 17/116,792

(22) Filed: Dec. 9, 2020

(65) Prior Publication Data
US 2021/0266200 A1    Aug. 26, 2021

Related U.S. Application Data

(60) Provisional application No. 62/981,662, filed on Feb. 26, 2020.

(51) Int. Cl.
*H04L 25/03* (2006.01)
*H04L 25/02* (2006.01)

(52) U.S. Cl.
CPC .... *H04L 25/03057* (2013.01); *H04L 25/0212* (2013.01)

(58) Field of Classification Search
CPC .............. H04L 25/03057; H04L 25/0212
See application file for complete search history.

(56) References Cited

U.S. PATENT DOCUMENTS

| | | | | |
|---|---|---|---|---|
| 9,749,162 | B1* | 8/2017 | Mobin | H04L 25/03057 |
| 9,843,309 | B2* | 12/2017 | Zerbe | H03K 3/013 |
| 2012/0027074 | A1* | 2/2012 | Raghavan | H04L 25/10 375/233 |
| 2013/0215954 | A1* | 8/2013 | Beukema | G06G 7/184 375/233 |
| 2015/0163077 | A1* | 6/2015 | Xu | H04L 25/03057 375/233 |
| 2016/0173300 | A1* | 6/2016 | Laufer | H04L 25/03057 375/233 |
| 2016/0248608 | A1* | 8/2016 | Fiedler | H04L 25/03057 |

* cited by examiner

*Primary Examiner* — Freshteh N Aghdam
(74) *Attorney, Agent, or Firm* — Duane Morris LLP

(57) ABSTRACT

An apparatus and method for providing a decision feedback equalizer are disclosed herein. In some embodiments, a method and apparatus for reduction of inter-symbol interference (ISI) caused by communication channel impairments is disclosed. In some embodiments, a decision feedback equalizer includes a plurality of delay latches connected in series, a slicer circuit configured to receive an input signal from a communication channel and delayed feedback signals from the plurality of delay latches and determine a logical state of the received input signal, wherein the slicer circuit further comprises a dynamic threshold voltage calibration circuit configured to regulate a current flow between output nodes of the slicer circuit and ground based on the received delayed feedback signal and impulse response coefficients of the communication channel.

18 Claims, 15 Drawing Sheets

DECISION FEEDBACK EQUALIZATION EMBEDDED IN A SLICER

BACKGROUND

Data transfer rate over a data communication channel (e.g., bus or backplane communication link) is limited by a number of factors including, for example, frequency dependent insertion loss, crosstalk noise, and reflection caused by impedance mismatch in media and discrete losses caused by vias, connectors, and various adapters. These impairments can reduce signal strength as well as cause inter-symbol interference (ISI) at a receiver. As such, ISI arising from channel imperfections may severely limit the transmission data rate. The ISI arises in bandwidth limited channels due to rising resistive and dielectric losses of the channel, which give rise to a long channel impulse response or frequency-dependent attenuation of the transmitted signal. Reflections caused by an impedance mismatch of the channel due to vias, connectors and branches in the channel, for example, can result in crests and troughs that are non-uniformly distributed over a large number of symbol intervals in a channel impulse response or sharp troughs in a frequency domain response. Thus, to implement electrical signaling at very high speeds (e.g., above 10 GB/s) an equalization method and system is needed to compensate for the ISI at the receiver.

A continuous-time linear equalizer (CTLE) can be employed at the receiver to boost the high frequency component around the Nyquist frequency of the signals to remove ISI. However, a continuous-time linear equalizer also amplifies noise and does not improve the SNR (Signal-to-noise ratio) of the signal. Both transmitter finite impulse response (FIR) equalization and receiver CTLE components are incapable of equalizing reflections caused by impedance mismatch and additionally can amplify the crosstalk noise.

On the other hand, a decision feedback equalizer (DFE) offers an effective ISI cancelling technique without noise amplification and minimal hardware for correcting inter-symbol interference (ISI) caused by previously transmitted symbols in the data communication channel. When utilizing a DFE, the eye-diagram or eye-opening can be used as a metric regarding performance of the DFE at the receiver. The eye-diagram measurement obtained at the receiver is a superposition of all possible realizations of the received signal as viewed within a particular signaling interval. The width of the eye opening defines the time interval over which the received signal can be sampled without imposition of errors such as errors caused by inter-symbol interference, while the vertical eye opening defines a noise margin for the receiver.

Generally, a DFE, in order to compensate for ISI, will adapt feedback from previously detected symbols to equalize a currently received symbol. For example, a number of previously decoded symbols may be multiplied by coefficients, or taps, to approximate ISI and then subtracted from the received symbol. However, in conventional DFE designs, the DFE feedback loop timing is not met at very high data rates, which severely limits the receiver's performance. As such, in conventional DFE designs, the DFE feedback loop delay may include: (1) a settling time of the slicer; (2) a settling time of the DFE summer amplifier; (3) a setup time of the slicer; and (3) a settling time of the storage elements like RS-latch or flip-flops. Therefore, current methods and systems for a DFE based compensation of ISI are not entirely satisfactory.

The information disclosed in this Background section is intended only to provide context for various embodiments of the disclosure described below and, therefore, this Background section may include information that is not necessarily prior art information (i.e., information that is already known to a person of ordinary skill in the art). Thus, work of the presently named inventors, to the extent the work is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAIL DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1A:
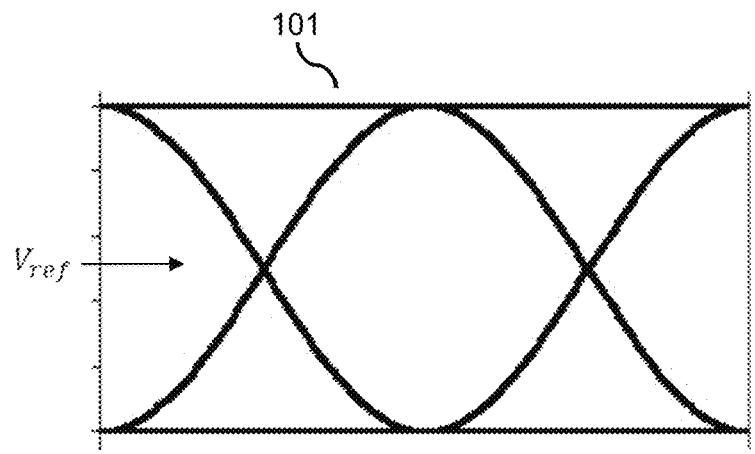
FIG. 1A is an illustration of a NRZ/PAM-2 eye diagram, consistent with several embodiments of the present disclosure.

FIG. 1A depicts a non-return-to-zero (NRZ)/Pulse Amplitude Modulation-2 (PAM-2) eye diagram 101. A NRZ/PAM-2 signaling scheme provides for two analog voltage levels, each corresponding to a single-bit transmitted over the communication channel. Here, a digital "0" is encoded as a low state of the transmitted signal, and a digital "1" is encoded as a high state of the signal. In the NRZ/PAM-2 signaling scheme, the input signals are compared to a single threshold voltage corresponding to $V_{ref}$ of a data slicer.

Figure 1B:
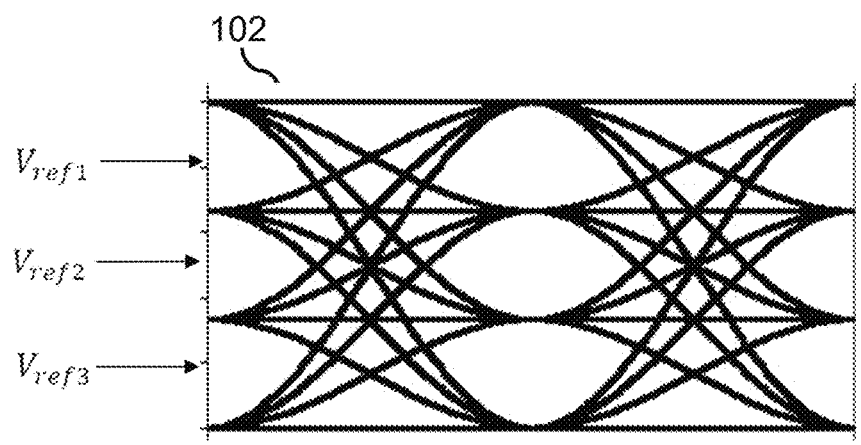
FIG. 1B is an illustration of a PAM-4 eye diagram, consistent with several embodiments of the present disclosure.

In another embodiment of the present disclosure, a quaternary (or four-level) pulse amplitude modulation (PAM-4) encoding scheme may be utilized for a data signal transmitted on a transmission channel. As such, PAM-4 scheme may have one of four different signal levels that each encode a particular 2-bit symbol. For example, the 2-bit sequence "00" may be encoded as a low level, the 2-bit sequence "01" may be encoded as a first higher level, the 2-bit sequence "10" is encoded as a next higher level, and the 2-bit sequence "11" is encoded as a highest level. FIG. 1B illustrates the eye diagram 102 of the PAM-4 encoding scheme. As can be noted from FIGS. 1A and 1B, PAM-4 encoding, operating at the same clock rate as a NRZ/PAM-2 scheme, is capable of transmitting twice the data as the NRZ/PAM-2 scheme. PAM-4 signaling provides three slicer thresholds (e.g., $V_{ref1}$, $V_{ref2}$, $V_{ref3}$).

Figure 1C:
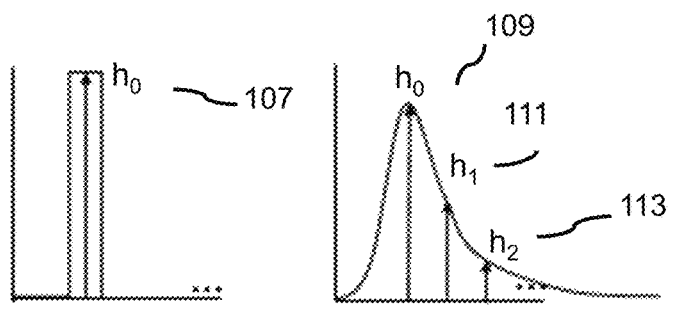
FIG. 1C is an illustration of an impulse response of a transmission channel, consistent with several embodiments of the present disclosure.

FIG. 1C illustrates the channel impulse response or a transfer function of a single input single output (SISO) discrete time linear channel modeled as 1-tap 107 and as a 3-tap 109, 111, and 113 linear filter. As shown in FIG. 1C, a communication channel, modeled as 1-tap linear filter 107, does not introduce an ISI on its output since the input signal is simply scaled by $h_0$. However, for example, a communication channel modeled as 3-tap linear filter that accounts for the channel impairments such as reflections due to impedance mismatch or cross-talk, may introduce an ISI on its output.

Figure 2:
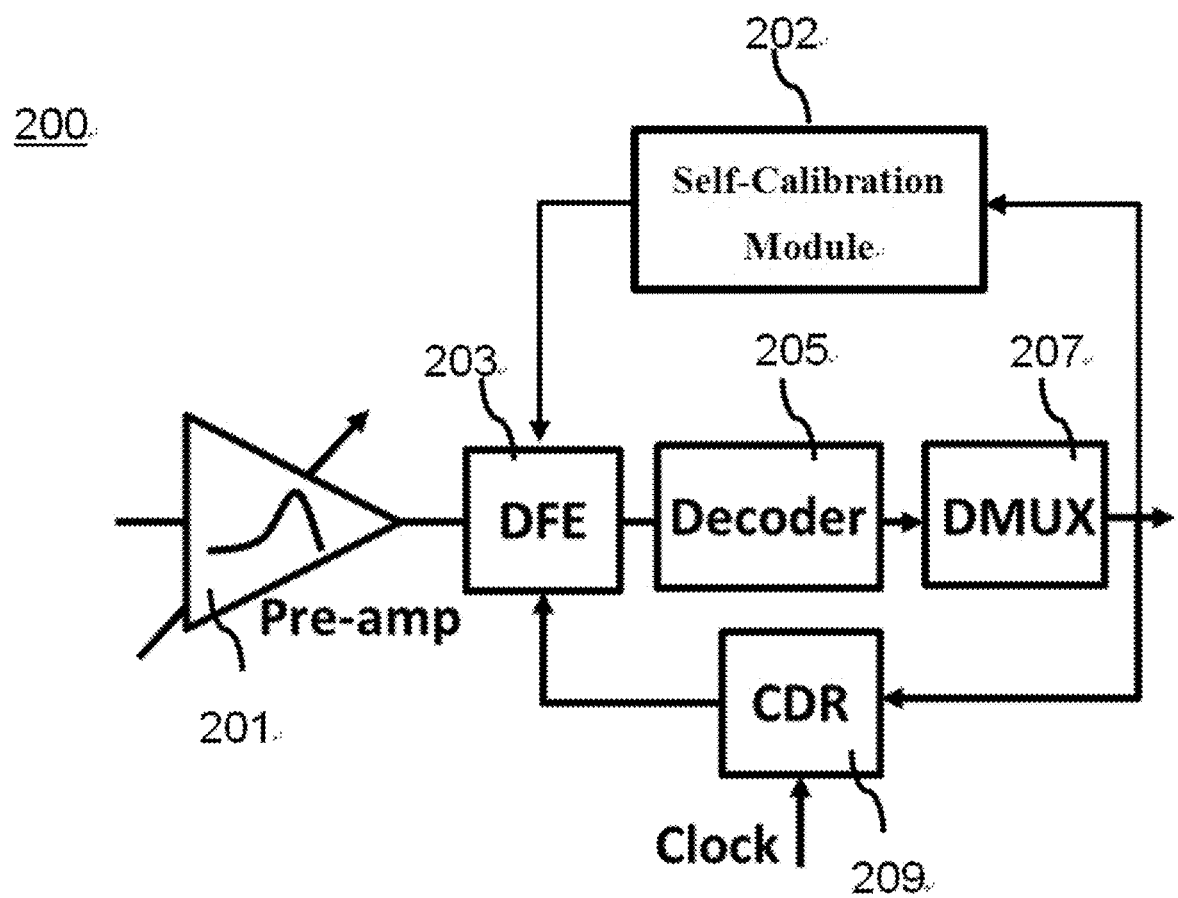
FIG. 2 is an illustration of decision feedback equalizer (DFE) embodied in a serializer/deserializer (SerDes) receiver device, consistent with several embodiments of the present disclosure.

As shown in FIG. 2, a serializer/deserializer (SerDes) receiver front-end 200 includes a continuous time linear equalizer (CTLE) 201 and a decision feedback equalizer 203 (DFE) that is followed by a decoder 205, a demultiplexer 207 (DMUX), which performs the serial-to-parallel conversion on the received data, and a clock and a data recovery (CDR) circuit 209, in accordance with some embodiments. In some embodiments, the CDR circuit 209 may be a circuit configured to receive an external clock signal and recover the transmission clock from a changing edge of the received data output from the DFE 203. As such, the CDR circuit 209, is optimized to sample data where the vertical eye opening of an eye diagram is the largest or at the middle of the eye to ensure signal integrity. Moreover, the decoder 205 determines the output data having four-level (two bits) from the outputs of the DFE 203, in accordance with some embodiments. In various embodiments, the serializer/deserializer (SerDes) receiver front-end 200 may include a self-calibration circuit 202 coupled to the DFE 203 and to an output of the DMUX 207. The self-calibration circuit 202 may be configured to adaptively learn N-tap linear filter coefficients ($h_1$, $h_2$, . . . , $h_N$) within the SerDes receiver. In other embodiments, the self-calibration circuit 202 may set a desired eye height with a predetermined value of $V_p$, before the DFE 203 adaptation loop is initiated. In some embodiments, self-calibration circuit 202 may include an eye peak detection module, a DFE adaptation loop, an automatic gain control loop configured to achieve the desired eye. In this regard, Least Mean Squares (LMS) algorithm may be utilized to achieve the convergence of the DFE filter coefficients ($h_1$, $h_2$, . . . , $h_N$). The self-calibration circuit 202 may be implemented in digital hardware logic or, alternatively, if the processing speed is not a concern, the self-calibration circuit 202 may be implemented in a software.

Figure 3:
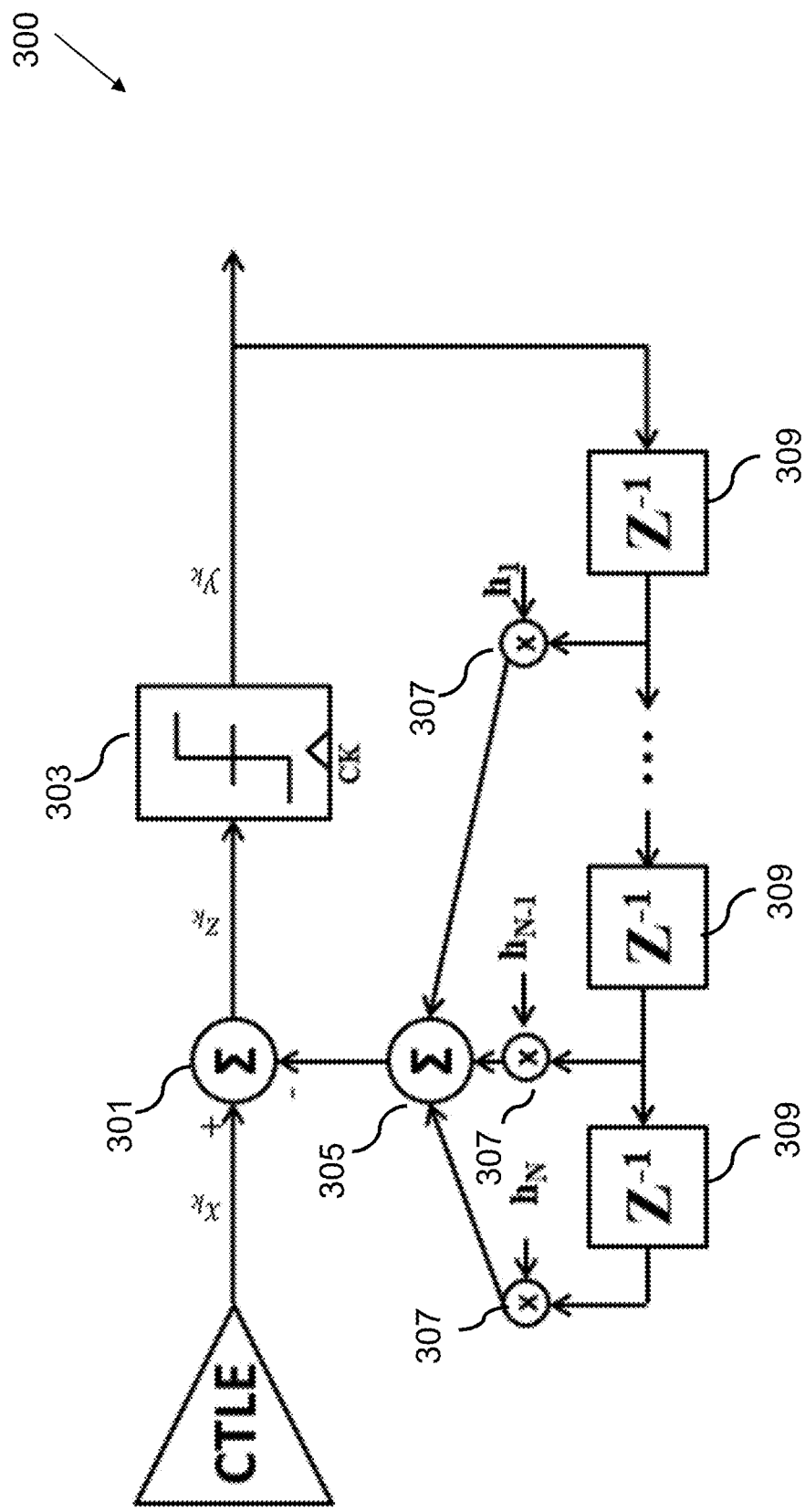
FIG. 3 is a block diagram of a decision feedback equalizer (DFE), consistent with several embodiments of the present disclosure.

FIG. 3 illustrates an N-tap decision feedback equalizer (DFE) 300, in accordance with various embodiments. In some embodiments, the DFE 300 can determine, from an input symbol $x_k$ received by the DFE 300, an intermediate value $z_k$, which can be expressed as:

$$z_k = x_k - \Sigma_{i=1}^{N} y_{k-i} h_i,$$

where $y_{k-i}$ represents feedback from the previously detected input symbol $x_{k-1}$, and $h_i$ are coefficients of the N-tap linear filter that models the communication channel impairments.

The DFE architecture illustrated in FIG. 3 uses linear combinations of the delayed versions of the previous decision outputs $y_k$ to cancel the ISI. Moreover, since a slicer 303 converts its input signals to binary decision outputs $y_k$, the linear combinations of the delayed versions of the previous decision outputs $y_k$ may be implemented with digital flip-flops 309 (FF), summers 301 and 305, and multipliers 307. In various embodiments, the digital flip-flops 309 may be implemented as SR ("set-reset"), D ("data" or "delay"), T ("toggle"), or JK latches.

For very high data rate applications, a tight timing constraint exists in the implementation of the DFE 300, as shown in FIG. 3. In one embodiment, the timing constraint for the first tap $h_1$ of the equalizer 300 involves a delay through the data slicer 303, the flip-flop 309, and the adders 301 and 305. In this embodiment, to ensure data integrity, the delay should settle within a one bit-time period. Thus, the implementation of the DFE 300 structure, as shown in FIG. 3, may require a high power consumption to meet the tight timing requirement.

Referring still to FIG. 3, in some embodiments, after subtracting (via the summer 301) a dot-product $\Sigma_{i=1}^{N} y_{k-i} h_i$, calculated based on N previously detected symbols (to approximate ISI), from $x_k$, the slicer 303 compares $z_k$ to a threshold voltage $V_{ref}$ and generates a binary signal (e.g., a binary logic "1" or logic "0" in the case of NRZ/PAM-2 scheme) with respect to the final output symbol $y_k$. In a PAM-2 scheme, the slicer 303 may determine: if $z_k > V_{ref}$ then $y_k$="0"/"1"; otherwise ($z_k < 0$) $y_k$="1"/"0". As another example, in a PAM-4 scheme, the DFE slicer 303 can determine $y_k$: if $z_k > V_{ref1}$, $z_k > V_{ref2}$, $z_k > V_{ref3}$ then $y_k$="11"; if $z_k < V_{ref1}$, $z_k > V_{ref2}$, $z_k > V_{ref3}$ then $y_k$="10"; if $z_k < V_{ref1}$, $z_k < V_{ref2}$, $z_k > V_{ref3}$ then $y_k$="01"; otherwise ($z_k < V_{ref1}$, $z_k < V_{ref2}$, $z_k < V_{ref3}$) $y_k$="00".

Moreover, in accordance with various embodiments of the present disclosure, the N-tap linear filter coefficients ($h_1$, $h_2$, ..., $h_N$) may be learned adaptively within the SerDes receiver. For example, in one embodiment, the self-calibration module 202, embedded the SerDes receiver, may be configured to vary the N-tap ($h_1$, $h_2$, ..., $h_N$) coefficients from their initial value across a range of values, while tracking the respective CDR settling points, which determine data sampling times and further operable to select a value for the N-tap ($h_1$, $h_2$, ..., $h_N$) coefficients from the range of values that maximizes sampled signal integrity.

Figure 4:
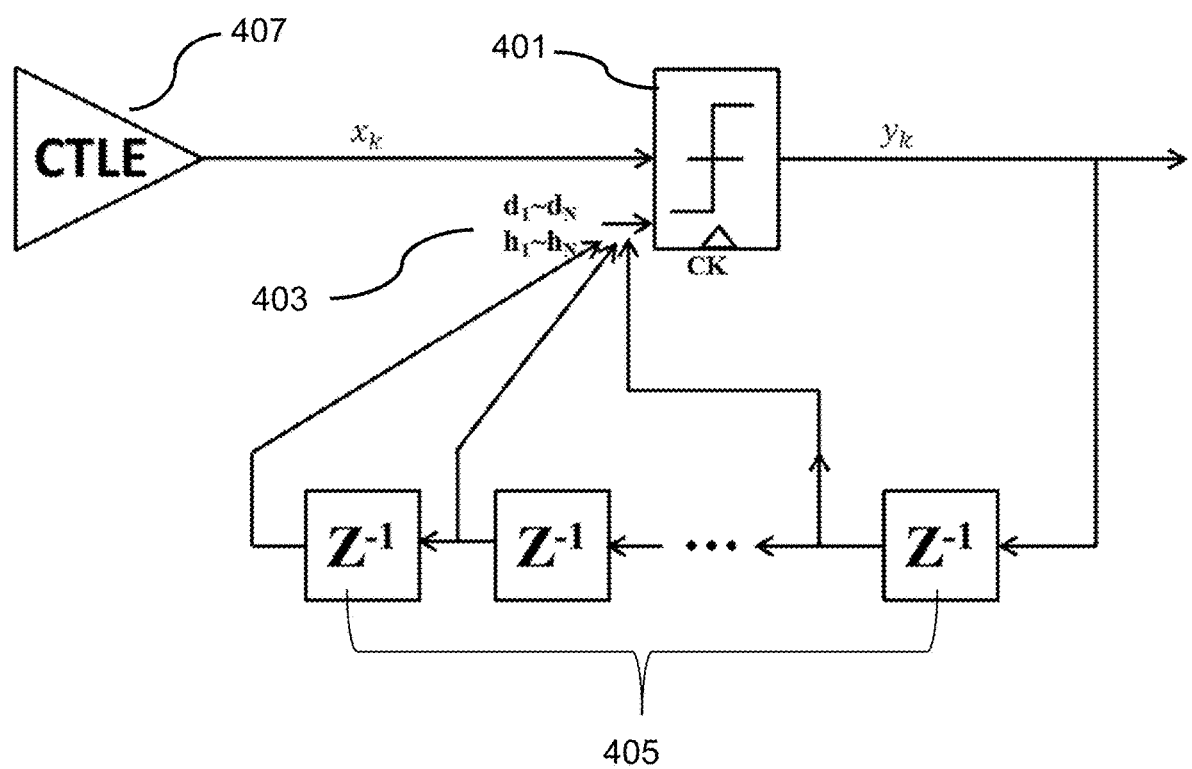
FIG. 4 is a block diagram of a decision feedback equalizer (DFE) with the feedback loop embedded in the slicer, consistent with several embodiments of the present disclosure.

Referring to FIG. 4, a feedback loop, comprising a plurality of summers and multipliers operable to implement the linear combination of the delayed versions of the previous decision outputs $y_k$, may be embedded in a slicer 401 of the DFE, in accordance with some embodiments. As shown in FIG. 4, the slicer 401 receives inputs ($d_1$, $d_2$, ..., $d_N$) and ($h_1$, $h_2$, ..., $h_N$) 403 in addition to a CK (clock) signal and an input symbol $x_k$ from the CTLE 407. In some embodiments, inputs ($d_1$, $d_2$, ..., $d_N$) may be delayed versions of the previous decision outputs $y_k$ and ($h_1$, $h_2$, ..., $h_N$) may be associated with coefficients of N-tap linear filter that models the communication channel impairments.

Figure 5A:
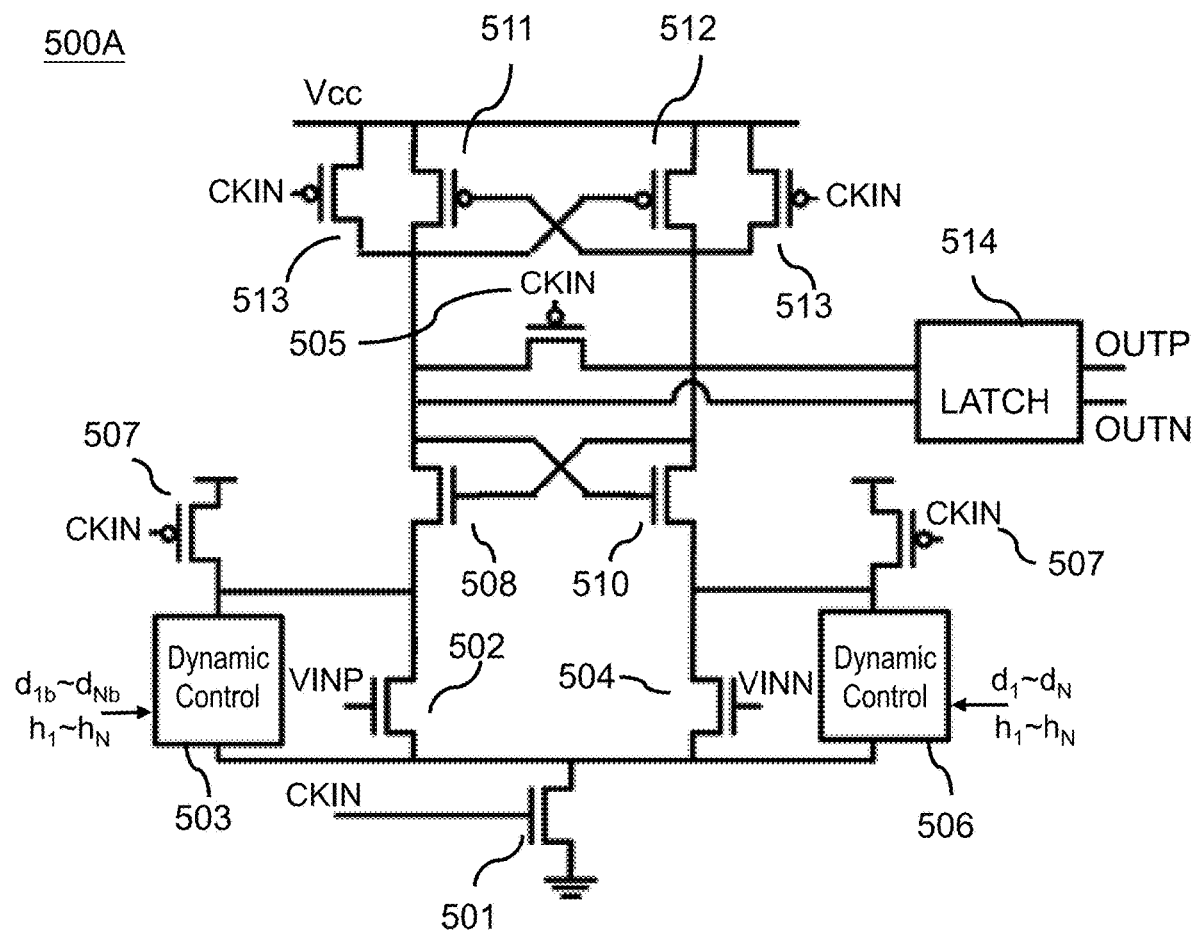
FIG. 5A illustrates a circuit diagram of a feedback loop of a DFE embedded in a slicer with a dynamic threshold voltage calibration circuitry, consistent with several embodiments of the present disclosure.

FIG. 5A illustrates a circuit diagram of a DFE slicer 500A with a dynamic threshold voltage calibration circuitry 503, in accordance with some embodiments. In some embodiments, as shown in FIG. 5A, the DFE slicer 500A includes a single stage clocked comparator circuit, which utilizes metal oxide semiconductor field effect transistors (MOSFETs). In other embodiments, other transistor technologies may be utilized to implement the comparator circuitry of the DFE slicer 500A, consistent with the present disclosure. Other transistor technologies may include, but are not limited to, bipolar junction transistor (BJT) technologies (e.g., npn BJTs, pnp BJTs, heterojunction BJTs), other field effect transistor (FET) technologies (e.g., junction field effect transistors (JFETs), finFETs, insulated gate FETs (IGFETs), etc), etc.

The single-stage clocked comparator circuitry depicted in FIG. 5A and used in NRZ/PAM-2 signaling schemes includes two transistor switches 513, in accordance with some embodiments. In some embodiments, the transistor switches 513 may be P-type or N-type MOSFETs. A respective gate of each of the transistor switches 513 are configured to receive a clock signal CKIN. The sources of the two transistors switches 513 are coupled to the supply voltage Vcc. The drain of one of the transistor switch 513 is coupled to an output node OutN via a latch 514. The drain of another transistor switch 513 is coupled to an output node OutP via the latch 514. In some embodiments, the outputs OutP and OutN are differential outputs that are latched using the latch circuit 514. In some embodiment, a transistor switch 505 is coupled to the source of the transistor switch 513 and the latch 514 and is further configured to receive a clock signal CKIN. In operation, a transistor switch 505 may short the drains of transistors 508 and 510 to the supply voltage Vcc when the clock signal CKIN is low. When the clock signal CKIN is high, the transistors 502, 504, 508, 510, 511, 512 will amplify the difference between voltages VINP and VINN applied to the gates of transistors 502 and 504, respectively so that the voltages at the drains of transistors 508 and 510 will exhibit a complementary logic. Moreover, the outputs OUTP and OUTN may change, through latch 514, based on the voltage levels at the drains of transistors 508 and 510. In various embodiments, the latch circuit 514 may be implemented as SR ("set-reset"), D ("data" or "delay"), T ("toggle"), or JK latch.

The clocked comparator circuitry of FIG. 5A also includes transistors 511 and 512 with drains coupled to Vcc. The gate of transistor 511 and the source of the transistor 512 are coupled to each other and to the output node OutP via the latch 514. The gate of the transistor 512 and the source of transistor 511 are coupled to each other and to the output node OutN via the latch 514. The clocked comparator circuitry further includes transistors 502 and 504. A gate of the transistor 502 is coupled to an input node VInP and a gate of the transistor 504 is coupled to an input node VInN. The sources of transistors 502 and 504 are coupled to each other and to a drain of a transistor 501. The gate of the transistor 501 is configured to receive the clock signal CKIN and the source of the transistor 501 is coupled to ground. The drain of the transistor 502 is coupled to a source of a transistor 508 and to a dynamic threshold voltage calibration circuit 503 configured to control the current flowing through the transistor 502. Similarly, the drain of the transistor 504 is coupled to a source of a transistor 510 and to a dynamic threshold voltage calibration circuit 506 configured to control the current flowing through the transistor 504. The gate of the transistor 508 is coupled to the output node OutP via the latch 514 and the gate of the transistor 510 is coupled to the output node OutN via the latch 514. The drain of the transistor 508 is coupled to the output node OutN via the latch 514 and the drain of the transistor 510 is coupled to the output node OutP via the latch 514. In some embodiments, the transistor switches 507 are driven by the clock signal CKIN and are configured to enable/disable the dynamic threshold voltage calibration circuits 503 and 506.

Referring still to FIG. 5A, the DFE slicer 500A circuitry may initially be in the reset state when the clock signal CKIN is low. As such, the transistor switches 513 may be on, i.e. conducting, therefore, coupling Vcc to the drains of the transistors 508 and 510, referred in FIG. 5A as nodes OutP1 and OutN1. Here, the outputs OUTP and OUTN of the latch 514 may keep their previous data when the drains of the transistors 508 and 510 are coupled to the supply voltage Vcc. Moreover, the transistor switches 511 and 512 may be off since their respective gate is driven with the supply voltage Vcc signal. The transistor switch 501 may be off since its gate is driven with the low clock signal CKIN. When the clock signal, CKIN, transitions from low to high, the switches 513 may then turn off, decoupling the output nodes OutN1 and OutP1 from the supply voltage Vcc, and the transistor 501 may turn on coupling the sources of transistors 502 and 504 to ground. At this point, the transistor 502 and/or transistor 504 may start conducting when the voltages VINP and/or VINN applied to the respective gates is greater than the threshold voltage of the respective transistor. if the voltage VNN is greater than the voltage VINP, the transistor 504 may begin to conduct before the transistor 502 conducts. When the transistor 504 begins to conduct, the transistor 510 may also conduct, while providing a current path between the output node OutP1 and ground. As the voltage on the output node OutP1 decreases from Vcc toward ground, the transistor 512 may turn on when the voltage at output node OutP1 minus the voltage at the output node OutN1 is more negative than the threshold voltage of the transistor 512. Similarly, if the voltage applied to the input node VINP is greater than the voltage applied to the input node VINN, the transistor 502 may begin to conduct before the transistor 504 conducts. When the transistor 502 starts conducting, the transistor 508 may also conduct, while providing a current path between the output node OutN1 and ground. As the voltage on output node OutN1 decreases from Vcc toward ground, the transistor 511 may turn on when the voltage on output node OutN1 minus the voltage on output node OutP1 is more negative than the threshold voltage of transistor 511. Thus, the differential voltage across the output nodes OutP and OutN may correspond to a decision of the clocked comparator depicted in FIG. 5A.

The dynamic control circuitry 503 that regulates the current path between the output node OutP1 and OutN1 and ground through the transistors 508, 510, and 501 may be enabled via the transistor switch 507 controlled by the clock signal MIN, as shown in FIG. 5A, in accordance with various embodiments. Unlike the paths between the output nodes OutN1 and OutP1 and ground via the transistors 508, 502 and 501 or transistors 510, 504, and 501, the dynamic control circuitry 503 provides additional current paths between the output nodes OutP1, OutN1 and ground through the transistors 508, 510, and 501. As such, an exemplary advantage of the dynamic control circuitry 503 is that it effectively controls an equivalent dynamic offset voltage shift of threshold voltage $V_{ref}$, which results in reduced ISI. Another exemplary advantage of the dynamic control circuitry 503 is that it does not increase the power consumption of the DFE slicer 500A. Moreover, the dynamic control circuitry 503 is further configured to regulate the current flow between at least one output node OutP and/or OutN, and ground, in response to CKIN and based on N-tap linear filter coefficients ($h_1, h_2, \ldots, h_N$) and delayed versions of the previous outputs of the DFE slicer 500A ($d_1, d_2, \ldots, d_N$). In some embodiments, the N-tap linear filter coefficients ($h_1, h_2, \ldots, h_N$) that regulate the current flow in the dynamic control circuitry may be learned adaptively within the SerDes receiver.

Figure 5B:
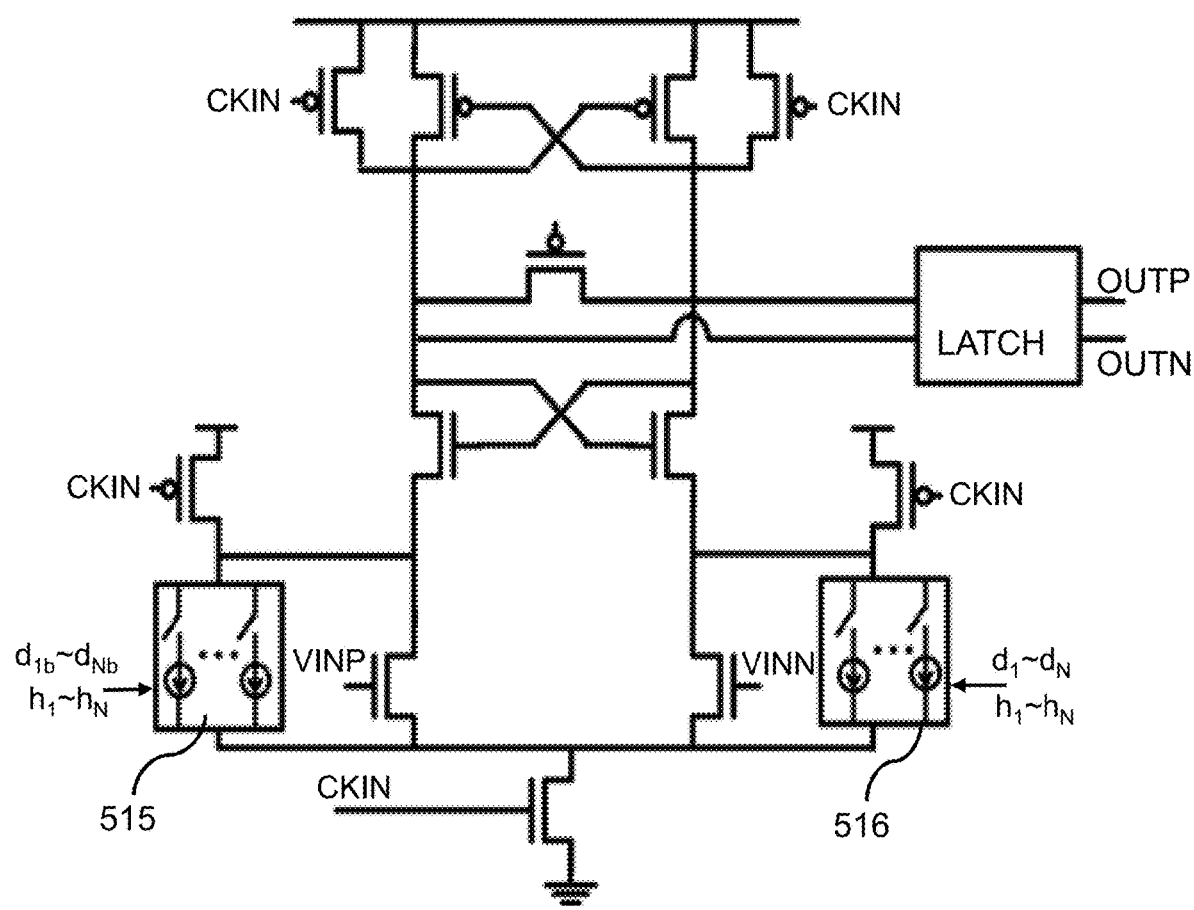
FIG. 5B illustrates a DFE slicer with the dynamic control circuitry implemented as a plurality of current sources, consistent with several embodiments of the present disclosure.

FIG. 5B illustrates a respective example of the DFE slicer 500A with dynamic threshold voltage calibration circuitry 515 and 516 implemented as a plurality of current sources $I_1 \ldots I_N$, in accordance with some embodiments. As such, the DFE slicer 500B with the dynamic threshold voltage calibration circuitry 515 and 516 is equivalent to an N-tap linear filter that models the communication channel impairments. In other embodiments, the dynamic threshold voltage calibration circuitry 515 and 516 are further configured to regulate the plurality of current sources $I_1 \ldots I_N$ based on the N-tap linear filter coefficients ($h_1, h_2, \ldots, h_N$) and delayed versions of the previous outputs of the DFE slicer 500B ($d_1, d_2, \ldots, d_N$). In some embodiments, the plurality of current sources $I_1 \ldots I_N$ of the dynamic threshold voltage calibration circuitry 515 and 516 may be learned adaptively within the SerDes receiver to reduce the ISI. Other elements of the circuitry shown in FIG. 5B are similar to corresponding elements shown in FIG. 5A. Thus, to avoid redundancy, a description of such elements is not repeated here.

Figure 6:
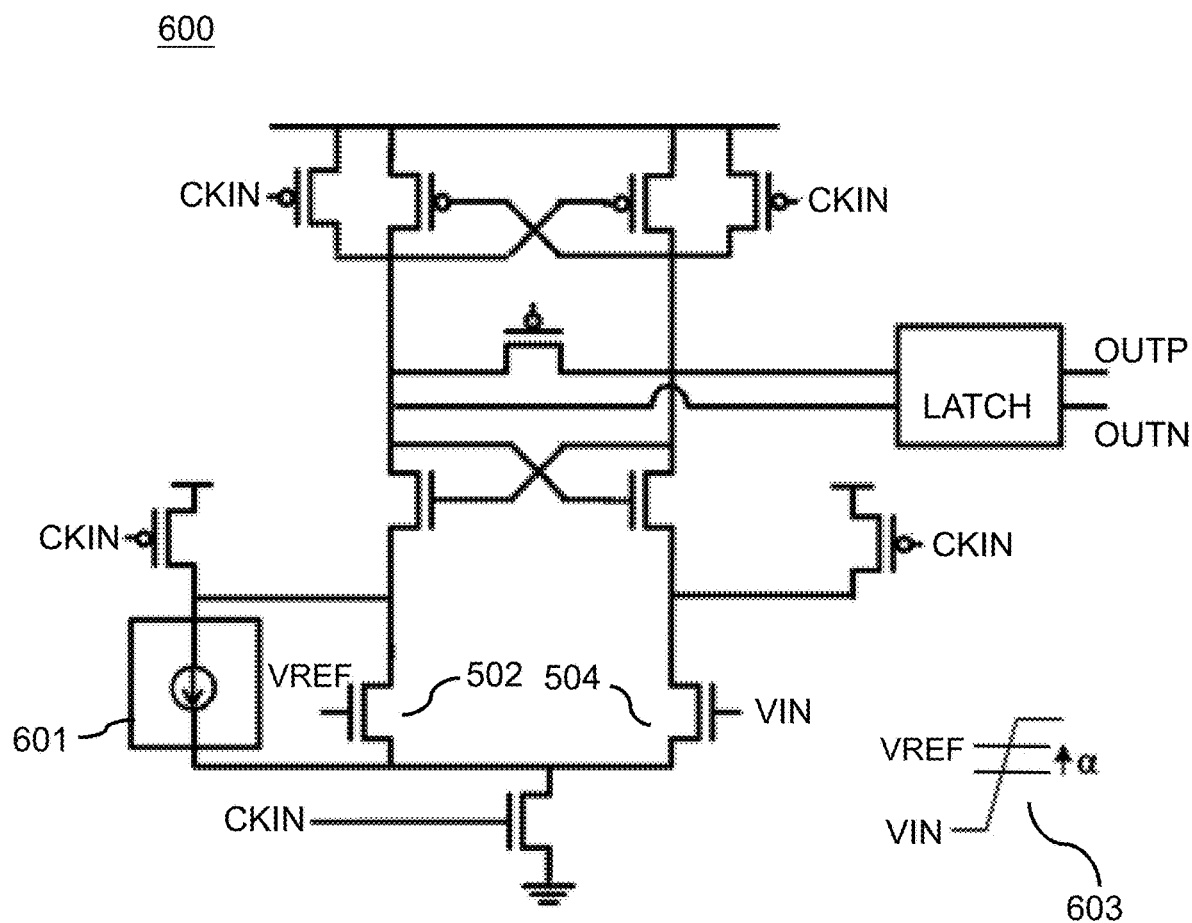
FIG. 6 illustrates a DFE slicer with the dynamic control circuitry implemented as a current source, consistent with several embodiments of the present disclosure.

FIG. 6 illustrates a respective example of the DFE slicer 500A with the dynamic control circuitry implemented as a single current source $I_1$ 601, in accordance with some embodiments. As such, FIG. 6 shows a single ended comparator circuitry of the DFE slicer 600. in some embodiments, the current source $I_1$ 601 is associated with a dynamic offset voltage shift±α 603. In operation, when the input voltage VIN applied to a gate of a transistor 504 is equal to the voltage $V_{ref}$ applied to a gate of a transistor 502, the differential output of the DFE slicer 600 may be logical "0" and when VIN is larger than $V_{ref}+\alpha$ (i.e. $I_1+I_{ref}<I_{in}$, where $I_{in}$ is the current flow through the transistor 504 and $I_{ref}$ is the current flow through the transistor 502), the differential output of the DFE slicer 600 may be logical "1". In other embodiments, the current source $I_1$ 601 may be learned adaptively within the SerDes receiver to reduce the ISI. In these embodiments, the current source $I_1$ 601 may be dynamically controlled based on the previous output of the DFE slicer 600. In some embodiments, an exemplary advantage of the DFE slicer 600 is that it provides a dynamic reference voltage $V_{ref}$ that changes based on previous outputs of the DFE slicer 600. Yet another advantage of the DFE slicer 600 is that it does not increase the power consumptions of the DFE slicer 600 compared to traditional DFE slicer architectures. Other elements of the circuitry shown in FIG. 6 are similar to corresponding elements shown in FIG. 5A. Thus, to avoid redundancy, a description of such elements is not repeated here.

Figure 7A:
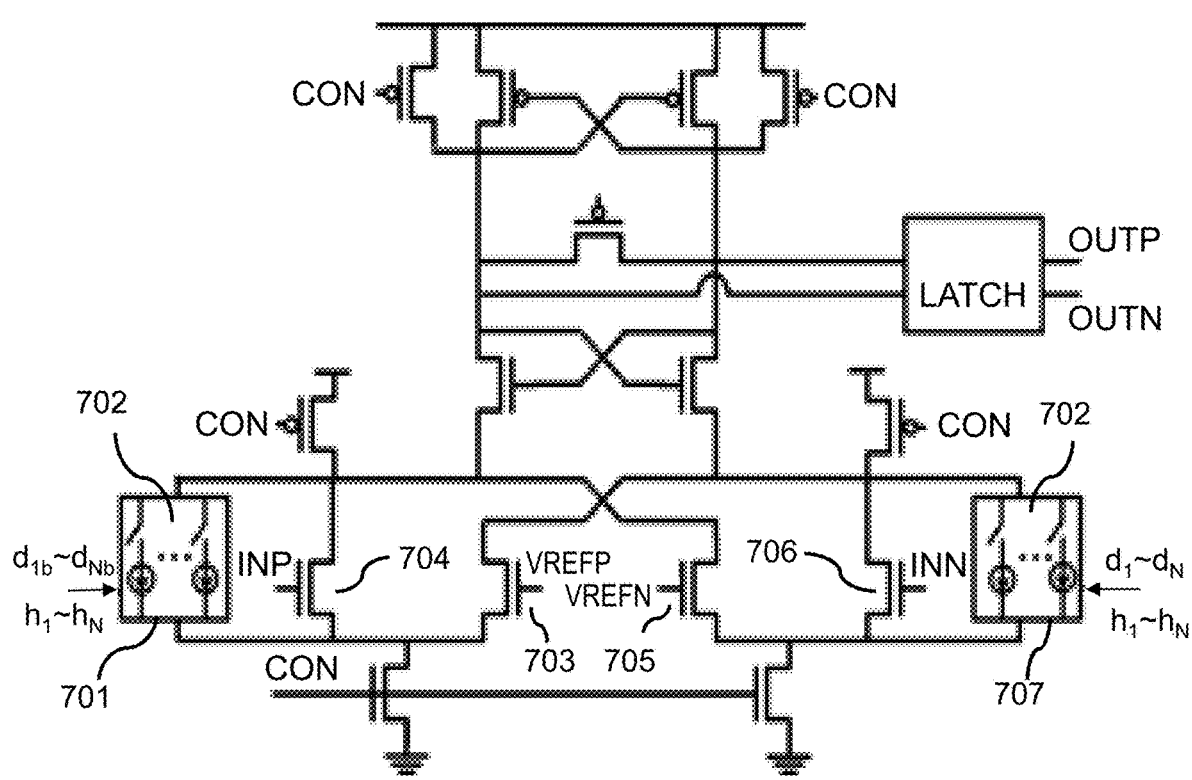
FIG. 7A illustrates a double ended comparator circuitry of a DFE slicer with dynamic offset voltage calibration circuitry, in accordance with some embodiments.

Turning now to FIG. 7A, a double ended comparator circuit of a DFE slicer 700A, with dynamic threshold voltage calibration circuitry is shown, in accordance with some embodiments of the present disclosure. In some embodiments, dynamic threshold voltage calibration circuitry 701 and 707 are each implemented as a plurality of current sources $I_1 \ldots I_N$. As such, the DFE slicer 700A with the dynamic threshold voltage calibration circuitry 701 and 707 is equivalent to an N-tap linear filter that models the communication channel impairments. In other embodiments, the dynamic threshold voltage calibration circuitry 701 and 707 are further configured to regulate the plurality of current sources $I_1 \ldots I_N$ based on the N-tap linear filter coefficients ($h_1, h_2, \ldots, h_N$) and delayed versions of the previous outputs of the DFE slicer 700A ($d_1, d_2, \ldots, d_N$). In some embodiments, the plurality of current sources $I_1 \ldots I_N$ may be regulated with switches 702. In other embodiments, the plurality of current sources $I_1 \ldots I_N$ may be learned adaptively using any learning method with the goal of reducing ISI.

In one embodiment, the plurality of current sources $I_1 \ldots I_N$ in the dynamic threshold voltage calibration circuitry 701 and 707 are associated with dynamic offset voltage shifts±$\alpha_1 \ldots \pm\alpha_N$ that are related to the N-tap linear filter coefficients ($h_1, h_2, \ldots, h_N$). In operation, when the input voltage INP applied to a gate of a transistor 704 is greater than the voltage $V_{REFP}\pm\alpha_1 \ldots \pm\alpha_N$, where $V_{REFP}$ is applied to a gate of a transistor 703, and the input voltage INN applied to a gate of a transistor 706 is less than the voltage $V_{REFN}\pm\alpha_1 \ldots \pm\alpha_N$, where $V_{REFN}$ is applied to a gate of a transistor 705, the differential output of the DFE slicer 700A may be logical "1" and when the input voltage INP is less than the voltage $V_{REFP}$ and the input voltage INN is greater than the voltage $V_{REFN}$, the differential output of the DFE slicer 700A may be logical "0". In particular, when the input voltage INP is greater than the voltage $V_{REFP}\pm\alpha_1 \ldots \pm\alpha_N$, $I_1 \ldots +I_N+I_{refp}<I_{inp}$, where $I_{inp}$ is the current flow through the transistor 704 and $I_{refp}$ is the current flow through the transistor 703. Similarly, when the input voltage INN is less than the voltage $V_{REFN}\pm\alpha_1 \ldots \pm\alpha_N$, $I_1 \ldots +I_N+I_{refn}>I_{inn}$, where $I_{inn}$ is the flow current through the transistor 706 and $I_{refn}$ is the current flow through the transistor 705.

Figure 7B:
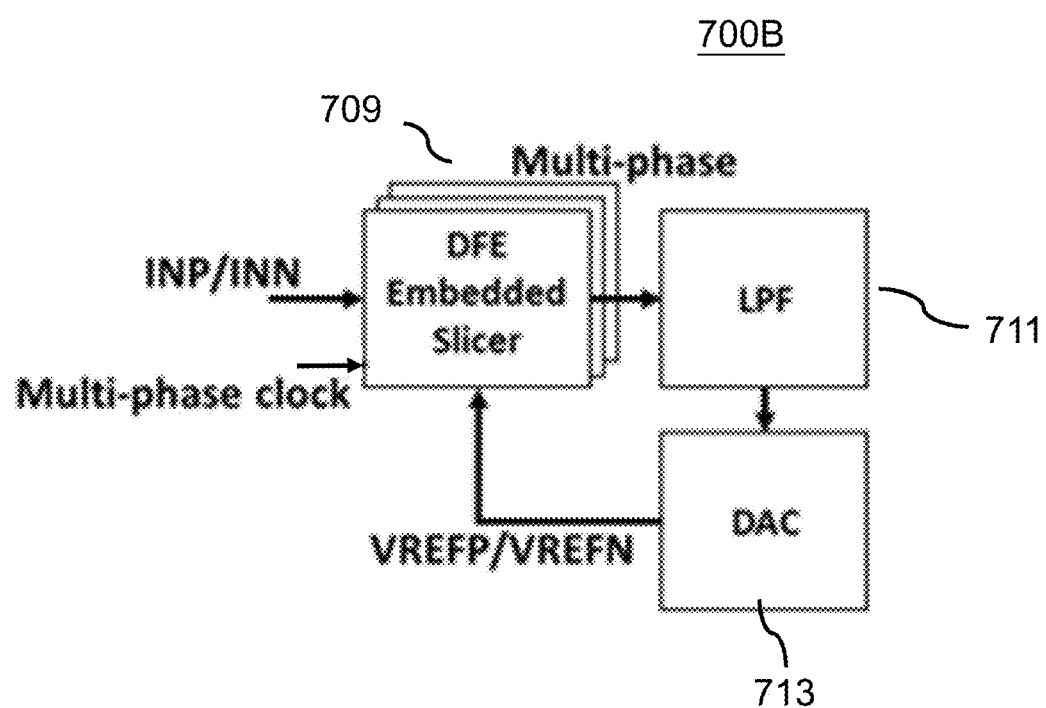
FIG. 7B shows a block diagram of a self-calibration module for determining voltage reference in PAM-2 decoding receivers, in accordance with some embodiments.

FIG. 7B shows a block diagram of a self-calibration module 700B for determining a voltage reference or threshold signals needed for a DFE slicer 709, consistent with several embodiments of the present disclosure. In some embodiments, in order to improve timing margins of the receiver front-end 200, a multi-phased clock may be used. As shown in FIG. 7B, the self-calibration module 700B includes a digital-to-analog converter (DAC) 713 coupled to a low pass filter 711 and operable to select voltage reference or threshold signals (VREFP/VREFN) for the DFE 709 slicer. In various embodiments, the low pass filter 711 may be implemented in the DAC 713. In some embodiments, the self-calibration module 700B adaptively computes the threshold signals VREFP/VREFN based on previous outputs of the DFE 709. In one embodiments of the inventions, the threshold signals are determined using the Least Mean Square (LMS) algorithm, which approximates the steepest descent algorithm. The LMS algorithm may include an adaptation coefficient μ, which determines the pace of the convergence. Of course, in other embodiments, the self-calibration module 700B may sweep the threshold signals VREFP/VREFN to determine the optimal threshold based on acceptable bit error rate results. As such, VREFP may be defined as VREFP=VCOM+β and VREFN may be defined as VREFN=VCOM+β, where VCOM is a some common voltage and β is a parameter that is swept between a predetermined range of values $\beta \in [\underline{\beta}, \overline{\beta}]$.

Figure 7C:
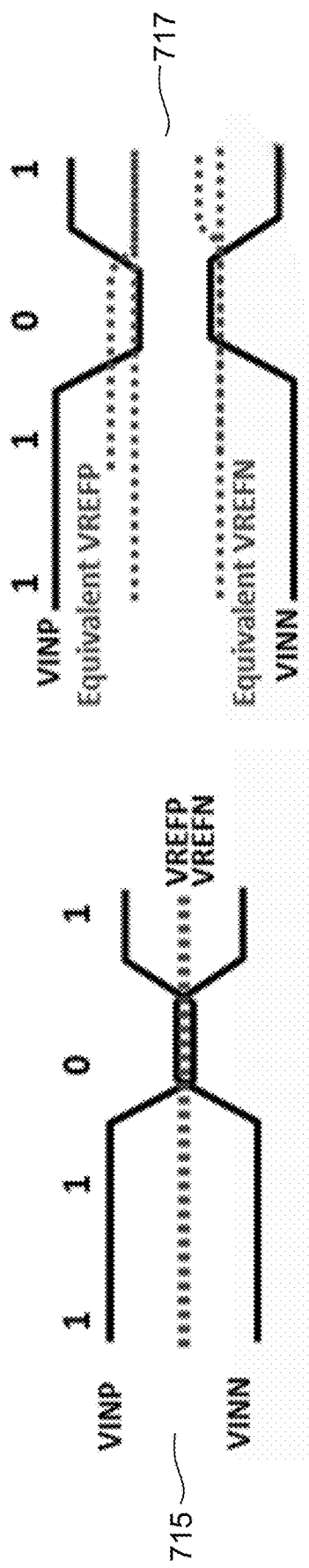
FIG. 7C illustrates NRZ/PAM2 signaling diagrams, in accordance with some embodiments.

FIG. 7C illustrates NRZ/PAM2 signaling diagrams. As such, in the signaling diagram 715, the NRZ/PAM2 data (e.g., "1101") is received at a DFE slicer with its threshold voltage level set to zero (e.g., VREFP/VREFN=0). The signaling diagram 715 also shows that the threshold voltage level may be used to determine whether a received voltage signal is above (including equal to) or below the threshold voltage level. For example, a DFE slicer, without dynamic offset voltage calibration, may determine that the third received data sample is above the threshold VREFP and decide that a logic "1" was sent, while a logic "0" was originally sent, therefore, resulting in ISI, as shown in FIG. 7C. On the other hand, the signaling diagram 717 shows that the threshold voltage (e.g., VREFP/VREFN) levels may be dynamically offset, which provides more margin in determining whether a received voltage signal is above (including equal to) or below the offset threshold voltage levels. For example, a DFE slicer 700A, with dynamic offset voltage calibration, may provide an increased noise margin and enhanced eye opening, as shown in FIG. 7C. Furthermore, even though the above description is generally related to an NRZ/PAM-2 mode of communication, it is applicable to PAM-4 or other types of modulation.

Figure 8:
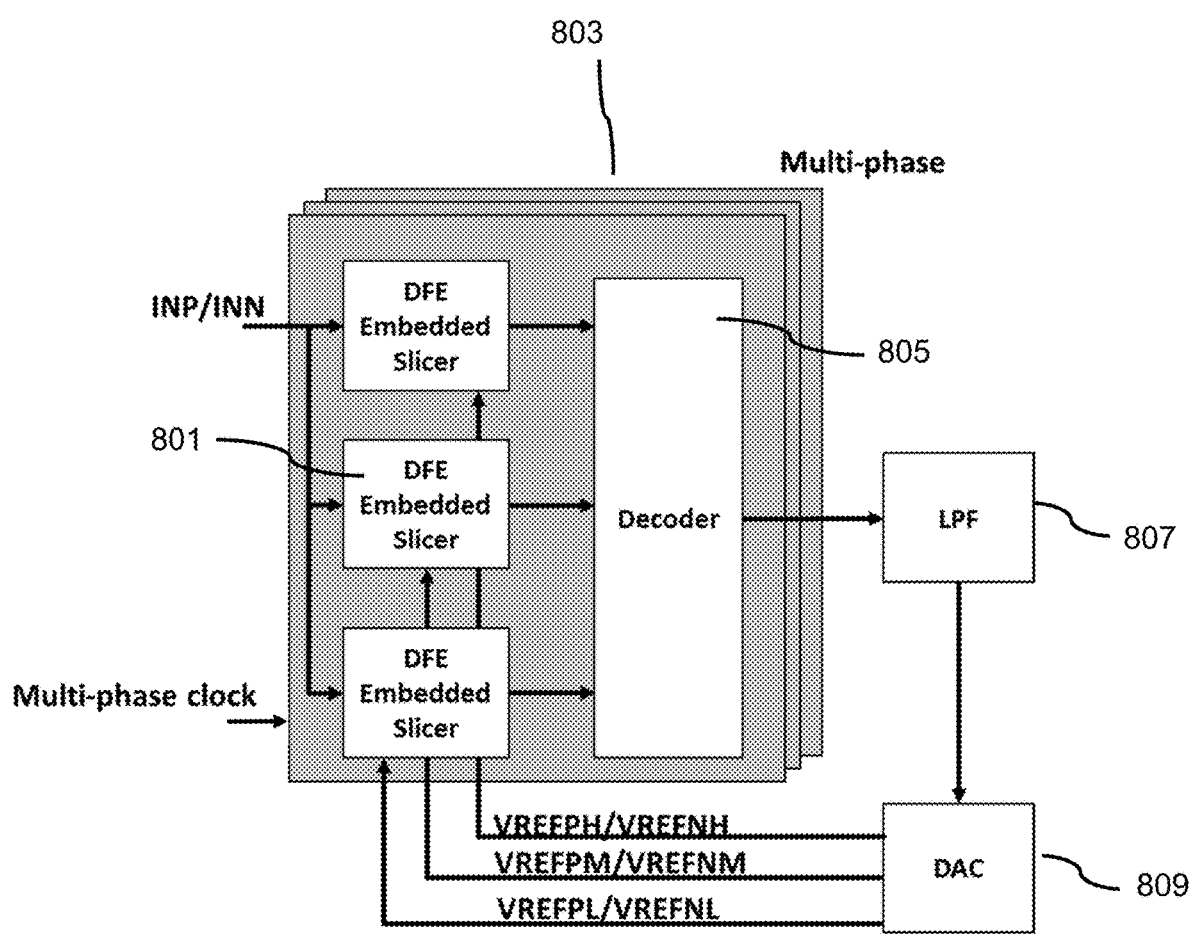
FIG. 8 illustrates a self-calibration module for determining voltage reference in PAM-4 decoding receivers, in accordance with some embodiments.

FIG. 8 illustrates a self-calibration module 803 for determining voltage reference or threshold signals needed for the DFE slicers embedded in PAM-4 decoding receivers, in accordance with some embodiments. In accordance with various embodiments, in order to improve timing margins of the receiver front-end 200, a multi-phased clock may be used, as shown in FIG. 8. In some embodiments, each self-calibration module 803 may provide time-varying discrete or continuous voltage reference or threshold signals in order to produce a larger eye diagram opening, which can facilitate faster data rates and reduced bit-error rate (BER) in the SerDes receivers. In some embodiments, each self-calibration module 803 includes three DFE embedded slicers 801 operable to compare data symbols with thresholds $V_{ref1}$, $V_{ref2}$, $V_{ref3}$, respectively, to determine the state of data symbols and subsequently their corresponding bit mapping. In various embodiments, each self-calibration module 803 may further include a decoder 805 configured to decode data from a series of binary data received from the DFEs 801. In this regard, the decoder 805, may determine the most likely sequence of state transitions for the received series of binary data, wherein each such state represents a symbol instant. The decoder 803 may also be implemented as a Maximum A posteriori Probability (MAP) Decoder or a Maximum Likelihood Sequence Estimation Viterbi (MLSE) Decoder, in accordance with various embodiments of the present disclosure.

In addition, a self-calibration module 803 may include a low pass filter (LPF) 807 coupled to an output of the decoder 805. An output of the LFP 807 is received by a digital to analog converter (DAC) 809, which provides analog voltage reference or threshold levels to the DFE slicer 801. In some embodiments, the voltage reference or threshold levels needed for the DFE slicers 801 provided by the DAC 809 are learned autonomously by various search algorithms, descent methods, heuristics or other control loops, with various learning goals, depending on implementation (e.g., Zero-Forcing of the ISI, Maximization of Signal to Noise Ratio, Minimum Mean Square Error (MMSE), etc.). Some self-calibration modules 803 of various embodiments may have a mixture of these learning methods. Furthermore, the autonomous learning may occur during a normal operating mode and/or a calibration mode. Thus, the adaptation may be performed once, continuously (online), and/or as needed.

Figure 9A:
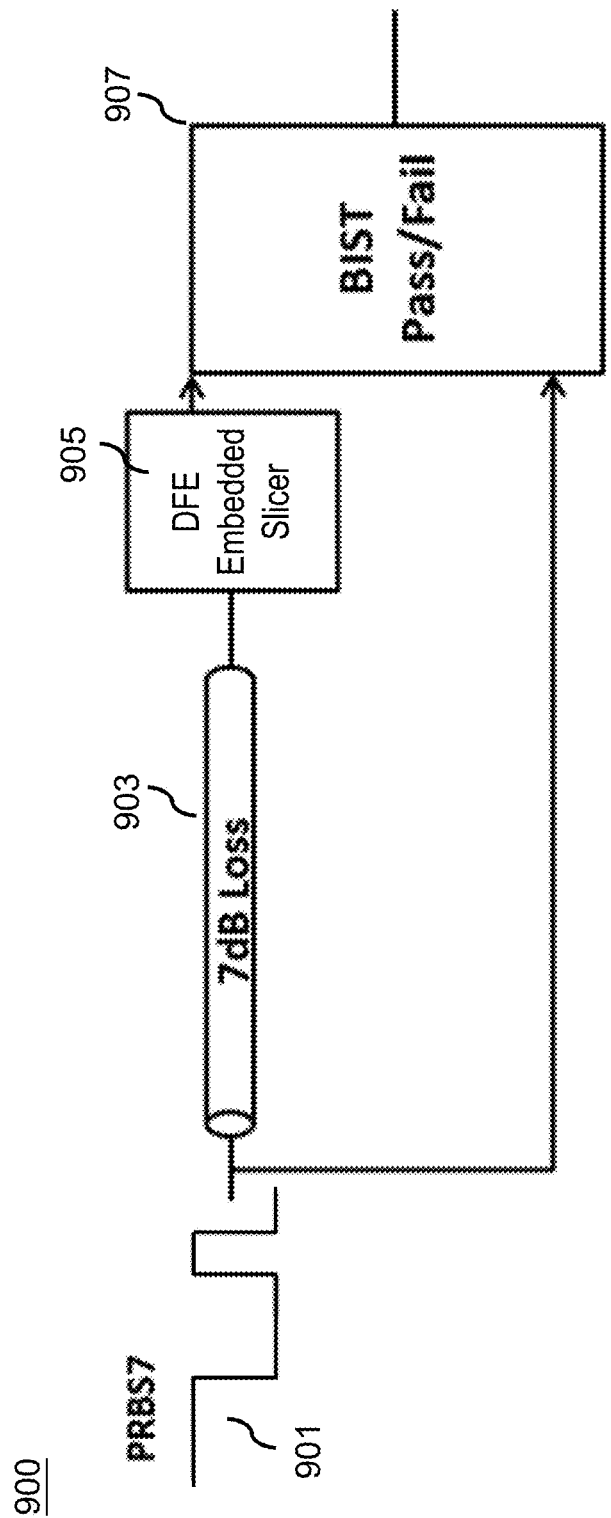
FIG. 9A illustrates an eye diagram measuring test circuit for a DFE with the feedback loop embedded in the slicer, in accordance with some embodiments.
Figure 9B:
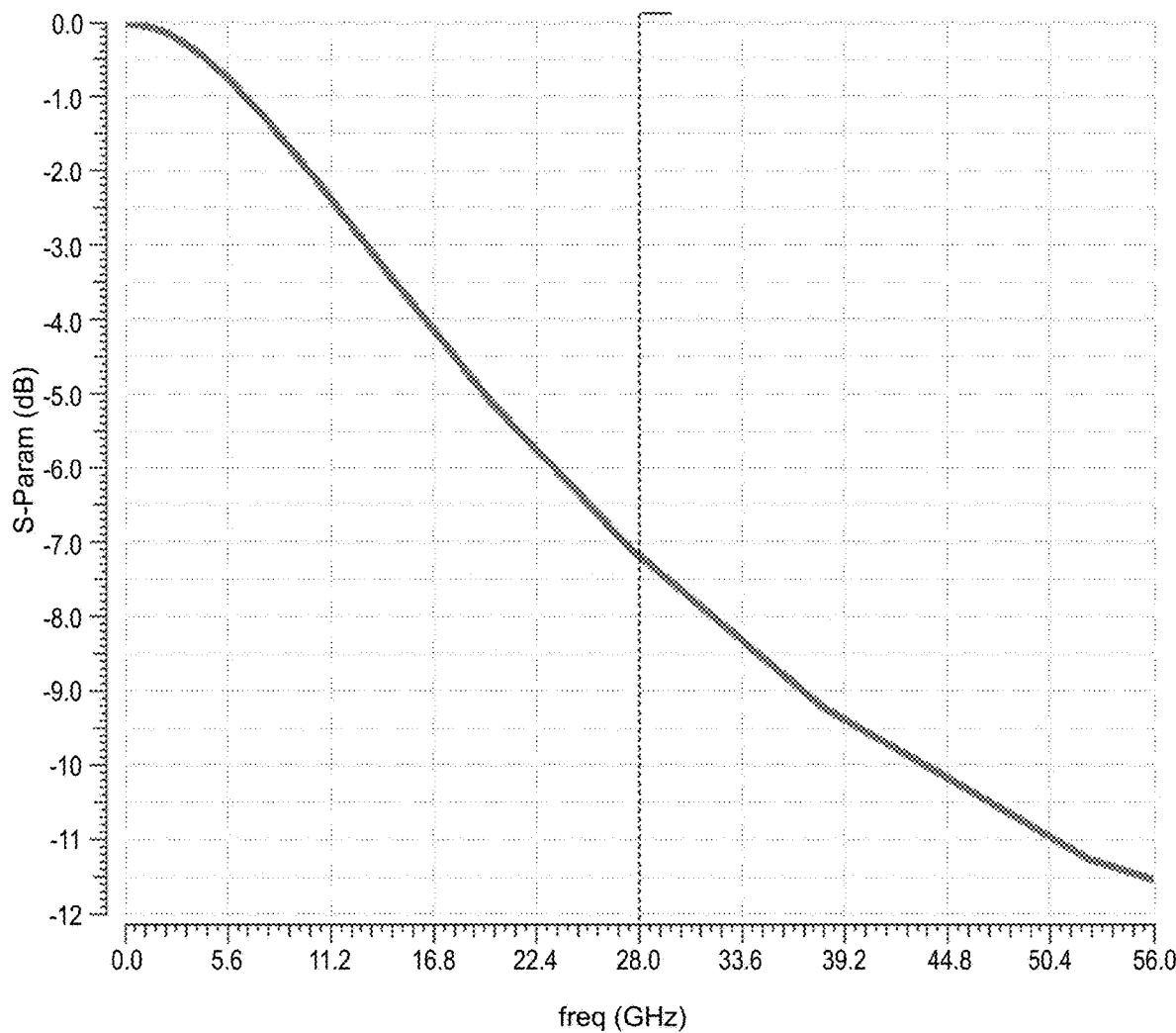
FIG. 9B illustrates a communication channel profile, in accordance with some embodiments.
Figure 9C:
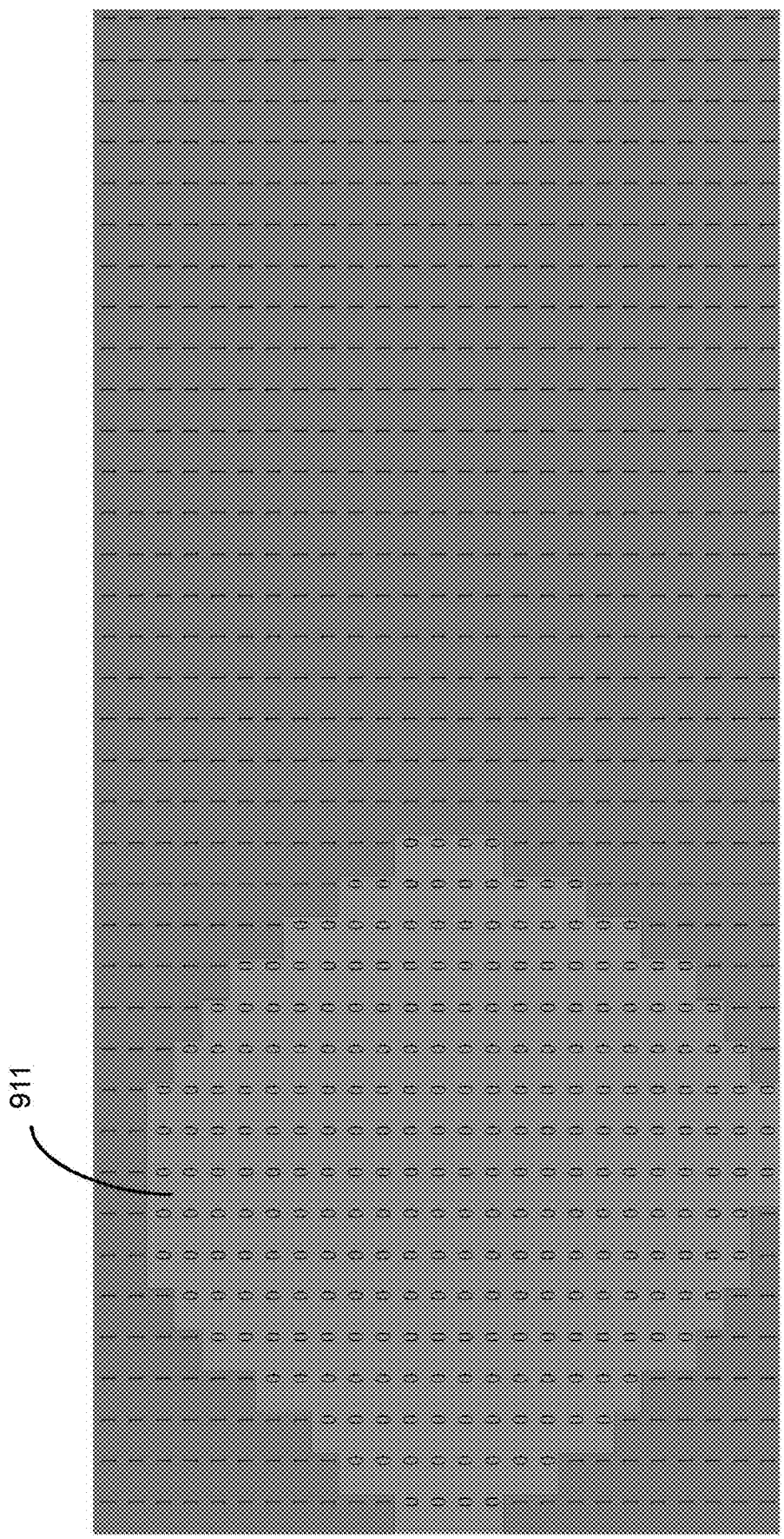
FIG. 9C illustrates an eye diagram from the eye diagram measuring circuit, in accordance with some embodiments.

As shown in FIG. 9A, the eye diagram measuring circuit 900 for a DFE with a feedback loop embedded in a slicer includes a signal source 901, a communication channel 903, a device under test 905 comprising the DFE with a feedback loop embedded in a slicer, and a Built-In-Self-Test (BIST) circuit 907 operable to perform eye monitoring on the equalized data signal. In some embodiments, the signal source 901 may include a pseudo random binary sequence (PRBS) data generator, wherein the PRBS data generator is further configured to include mode controls for selecting a desired PRBS sequence (e.g. PRBS7, PRBS23, etc.). As such, the desired PRBS sequence generated by the signal source 901 may have a desired frequency content. Moreover, the communication channel 903 may exhibit various frequency responses as shown in FIG. 9B. In this regard, FIG. 9B illustrates a magnitude 909 of the communication channel transfer function for a range of frequencies (e.g., 0 to 56 GHz). Furthermore, the quality of the measured eye diagram obtained from the data communication channel 903 with 7 dB loss, for example, and equalized by the DFE 905 is depicted in FIG. 9C. In this regard, a large eye diagram opening 911 is indicative of the quality of the operation of the DFE circuitry and the CDR circuitry associated with the DFE circuitry.

Figure 10:
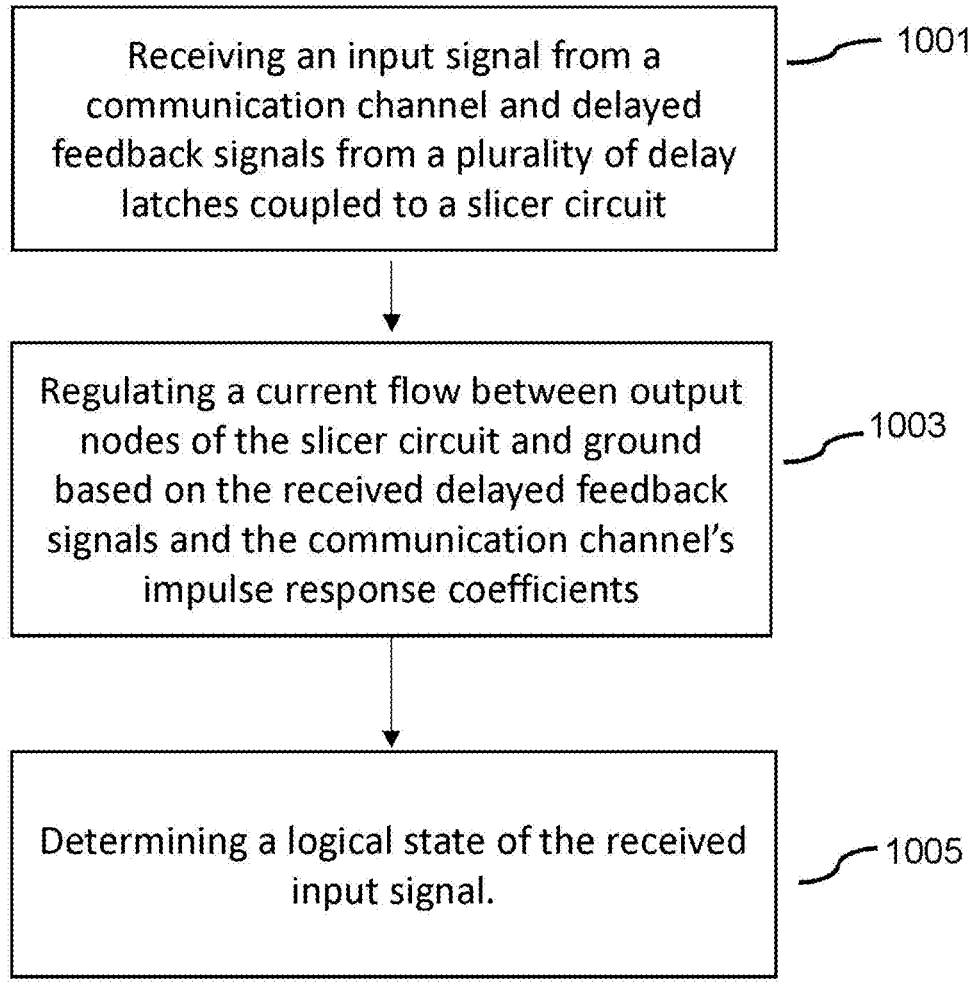
FIG. 10 illustrates a flow diagram of a method for reducing an inter-symbol interference (ISI), in accordance with some embodiments.

FIG. 10 illustrates a flow diagram of a method for reducing an inter-symbol interference (ISI), in accordance with some embodiments. At operation 1001, the DFE slicer 500A may receive an input signal from the communication channel 903. Moreover, at operation 1001, the DFE slicer 500A may also receive a delayed feedback signals from a plurality of delay latches, such as SR ("set-reset"), D ("data" or "delay"), T ("toggle"), or JK latches, that are coupled to the DFE slicer 500A. In some embodiments, the delayed feedback signals each corresponds to a bit history of the received input signal that is decided by the DFE slicer 500A.

At operation 1003, a current flow is regulated between output nodes of the DFE slicer 500A and ground based on the received delayed feedback signals and the communication channel's impulse response coefficients. In some embodiments, the current flow is regulated by controlling an off/on state of a plurality of current sources. In further embodiments, the off/on state of the plurality of current sources may be controlled by complementary metal-oxide-semiconductor (CMOS) switches.

At operation 1005, the DFE slicer 500A determines a logical state of the received input signal. More specifically, at operation 1005, the DFE slicer 500A may determine the logical state corresponding to the received input. In some embodiments, the logical state may correspond to one of four signal levels used in pulse amplitude modulation (PAM-4) encoding scheme.

In some embodiments, the present invention provides a decision feedback equalizer includes a plurality of delay latches connected in series, a slicer circuit configured to receive an input signal from a communication channel and delayed feedback signals from the plurality of delay latches and determine a logical state of the received input signal, wherein the slicer circuit further comprises a dynamic threshold voltage calibration circuit configured to regulate a current flow between output nodes of the slicer circuit and ground based on the received delayed feedback signal and impulse response coefficients of the communication channel. In further embodiments, the dynamic threshold voltage calibration circuit is enabled by a transistor switch controlled by a clock signal and the plurality of delay latches are implemented with digital flip-flops. In some embodiments, the dynamic threshold voltage calibration circuit comprises a plurality of current sources and a plurality of transistor switches configured to control an off/on state of the plurality of current sources.

In further embodiments, a receiver includes: a decision feedback equalizer (DFE) comprising a slicer circuit, wherein, the slicer circuit regulates a current flow between output nodes of the slicer circuit and ground based on a time-varying threshold voltage; and a self-calibration circuit coupled to the DFE and configured to adaptively adjust the time-varying threshold voltage of the slicer circuit. In some embodiments, the receiver further includes a decoder coupled to the DFE and configured to determine the most likely sequence of state transitions for a series of binary data received from the DFE. In further embodiments, the receiver further includes a demultiplexer (DMUX) coupled to the decoder and configured to perform a serial-to-parallel conversion on a received input data. In some embodiments, the self-calibration circuit is further configured to determine the time-varying threshold voltage using an approximate gradient descent algorithm, and further configured to sweep the time-varying threshold voltage to determine an optimal threshold voltage based on resulting bit error rates.

In alternative embodiments, a method includes: receiving an input signal from a communication channel and delayed feedback signals from a plurality of delay latches coupled to a slicer circuit; regulating a current flow between output nodes of the slicer circuit and ground based on the received delayed feedback signals and the communication channel's impulse response coefficients; and determining a logical state of the received input signal. In further embodiments, the step of regulating the current flow includes controlling an off/on state of a plurality of current sources and/or adaptively determining the communication channel's impulse response coefficients. In some embodiments, the method further includes determining the communication channel's impulse response coefficients by an approximate gradient descent algorithm.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A decision feedback equalizer (DFE) for reduction of inter-symbol interference (ISI), comprising:
   a plurality of delay latches connected in series;
   a slicer circuit configured to:
      receive an input signal from a communication channel and delayed feedback signals from the plurality of delay latches; and
      determine a logical state of the received input signal, wherein the slicer circuit comprises a dynamic threshold voltage calibration circuit configured to regulate a current flow between output nodes of the slicer circuit and ground based on the received delayed feedback signals and impulse response coefficients of the communication channel.

2. The DFE of claim 1, wherein the dynamic threshold voltage calibration circuit is enabled by a transistor switch controlled by a clock signal.

3. The DFE of claim 1, wherein the plurality of delay latches are implemented with digital flip-flops.

4. The DFE of claim 1, wherein the dynamic threshold voltage calibration circuit comprises a plurality of current sources and a plurality of transistor switches configured to control an off/on state of the plurality of current sources.

5. The DFE of claim 1, wherein the DFE is embodied in a self-calibration module configured to adaptively determine the communication channel's impulse response coefficients.

6. The DFE of claim 1, wherein the DFE is embodied in a serializer/deserializer (SerDes) receiver device.

7. The DFE of claim 1, wherein the delayed feedback signals each corresponds to a bit history of the received input signal decided by the slicer circuit.

8. A receiver comprising:
   a decision feedback equalizer (DFE) comprising a slicer circuit, wherein, the slicer circuit regulates a current flow between output nodes of the slicer circuit and ground based on a time-varying threshold voltage; and
   a self-calibration circuit coupled to the DFE and configured to adaptively adjust the time-varying threshold voltage of the slicer circuit.

9. The receiver of claim 8 further comprising a decoder coupled to the DFE and configured to determine the most likely sequence of state transitions for a series of binary data received from the DFE.

10. The receiver of claim 8, further comprising a demultiplexer (DMUX) coupled to the decoder and configured to perform a serial-to-parallel conversion on a received input data.

11. The receiver of claim 8, wherein the self-calibration circuit is further configured to determine the time-varying threshold voltage using an approximate gradient descent algorithm.

12. The receiver of claim 8, wherein the self-calibration circuit is further configured to sweep the time-varying threshold voltage to determine an optimal threshold voltage based on resulting bit error rates.

13. The receiver of claim 8 further comprising a clock and a data recovery (CDR) circuit coupled to the DFE and configured to recover a transmission clock from.

14. A method comprising:
   receiving an input signal from a communication channel and delayed feedback signals from a plurality of delay latches coupled to a slicer circuit;
   regulating a current flow between output nodes of the slicer circuit and ground based on the received delayed feedback signals and the communication channel's impulse response coefficients; and
   determining a logical state of the received input signal.

15. The method of claim 14, wherein the step of regulating the current flow comprises controlling an off/on state of a plurality of current sources.

16. The method of claim 14, wherein the step of regulating the current flow further comprises adaptively determining the communication channel's impulse response coefficients.

17. The method of claim 16, further comprising determining the communication channel's impulse response coefficients by an approximate gradient descent algorithm.

18. The method of claim 14, wherein the delayed feedback signals each corresponds to a bit history of the received input signal decided by the slicer circuit.

* * * * *